United States Patent [19]

Davis, Sr.

[11] Patent Number: 5,353,826
[45] Date of Patent: Oct. 11, 1994

[54] TENT TOPPER

[75] Inventor: James W. Davis, Sr., Louisville, Ky.

[73] Assignee: Noble Enterprises, Inc., Louisville, Ky.

[21] Appl. No.: 7,198

[22] Filed: Jan. 21, 1993

[51] Int. Cl.⁵ .......................................... E04H 15/06
[52] U.S. Cl. ...................................... 135/88; 296/100; 24/514; 248/231.7; 135/119
[58] Field of Search ................ 135/88, 119; 296/104, 296/105, 100, 159; 24/514, 525, 569; 248/231.7; 52/4, 23

[56] References Cited

U.S. PATENT DOCUMENTS

| | | | |
|---|---|---|---|
| 2,493,833 | 1/1950 | Reynolds | 135/6 |
| 2,565,746 | 8/1951 | Turner | 296/104 |
| 2,824,764 | 2/1958 | Stirling | 296/105 |
| 3,586,281 | 6/1971 | Schumer | 248/231.7 |
| 3,649,063 | 3/1972 | Stark | 135/88 X |
| 3,688,787 | 9/1972 | Feather | 135/88 X |
| 3,901,548 | 8/1975 | Seaman, Jr. | 135/88 X |
| 4,078,756 | 3/1978 | Cross | 248/231.7 |
| 4,221,085 | 9/1980 | Conaghan | 52/4 |
| 4,263,925 | 4/1981 | Arganbright | 135/88 X |
| 4,657,299 | 4/1987 | Mahan | 135/88 X |
| 4,846,803 | 7/1989 | Emerson | 248/231.7 X |
| 4,883,305 | 11/1989 | Horton | 296/105 |
| 4,915,440 | 4/1990 | Daniel et al. | 296/104 |
| 4,979,776 | 12/1990 | Schweickert | 296/100 |
| 5,050,924 | 9/1991 | Hansen | 296/100 |
| 5,066,063 | 11/1991 | Mullally | 296/100 |
| 5,186,513 | 2/1993 | Strother | 296/104 X |

Primary Examiner—Carl D. Friedman
Assistant Examiner—Lan C. Mai
Attorney, Agent, or Firm—Middleton & Reutlinger

[57] ABSTRACT

An easily removable tent topper designed to be installed on a truck bed when needed and be road worthy at highway speeds. The tent topper comprises a plurality of roll bar shaped assemblies and a tent. The tent has openings therein at preselected locations which permit the tent to engage a plurality of adjustable pins, the pins being part of the roll bar shaped assemblies. These pins, with their associated adjustment knobs, permit stretching or making taut the tent. Furthermore, the tent topper can be easily removed, disassembled, and stored in the truck cab behind the seat, as many truck owners do not like to permanently affix camper-type shells on their truck beds.

9 Claims, 3 Drawing Sheets

TENT TOPPER

BACKGROUND OF THE INVENTION (a) Field of the Invention

The present invention relates to a tent topper designed to fit on a truck bed and be road worthy at highway speeds. The tent of the tent topper has a plurality of openings therein at preselected locations which permit the tent to engage a plurality of adjustable pins. These pins, with their associated adjustment knobs, provide a means for stretching or making taut the tent to make the topper road worthy at highway speeds. Furthermore, the tent topper can be easily removed from the truck, disassembled, and stored in, for example, a suitcase-type container in the truck cab behind the seat, as many truck owners do not like to permanently affix camper-type shells on their truck beds.

(b) Description of the Prior Art

There are known canvas-type covers for boats and truck beds which are supported by some type of frame. In addition to the teachings described below, the military has used truck-type vehicles having canvas covered truck beds for many years. However, these covers, as well as the covers described below, do not provide a means for stretching the covers to make the covers more road worthy. This generally results in the covers "flapping" at highway speeds. Also, the covers do not provide the best protection in inclement weather.

U.S. Pat. No. 2,493,833, to Reynolds, teaches a boat canopy and frame having bows 12 comprising a pair of end sections 13 pivotally connected to a short section 14 at their inner ends and u-shaped clamp members 16 with bolt 17 at their other end for fastening bows 12 to boat side rail 11. Canopy 18 is supported by a pair of bows and is not affixed to the boat.

U.S. Pat. No. 4,915,440, to Daniel et al., teaches a plurality of fixedly attached u-shaped rigid supports which telescope. The rigid supports support a flexible cover which is secured to the truck bed by a plurality of snap fasteners.

U.S. Pat. No. 5,066,063, to Mullally, teaches a removable cover for a truck cargo box.

SUMMARY OF THE INVENTION

The present invention is for an easily stowable tent topper primarily designed to cover the bed of a pick-up truck. By having a means for stretching taut the tent of the tent topper, the topper protects things or persons in the bed from the outside weather and makes the topper more road worthy at highway speeds.

More particularly, the tent topper of the preferred embodiment of the present invention comprises three roll bar assemblies (nine separable pieces) and a tent. Each roll bar assembly includes a pair of supports and a means to connect the pair of supports. Each support has a bracket for mounting on the lip of a pickup truck bed with a means to secure the bracket to the lip, an upward support arm connected to the bracket at one end of the upward arm and to an inward support arm at the other end of the upward arm. Each support further includes an extender arm which has a means for stretching the tent. In the preferred embodiment, this stretching means includes an adjustable pin which retains the tent and an adjustment knob which will permit the tent to be made tauter. The tent contains a plurality of openings at preselected locations, one of which is engaged over each adjustable pin. Additional embodiments include a pair of tent belts which permit the tent to be tightened around the exterior sides of the pick-up truck bed. Further, see through transparent panels can be included in the tent to increase the visibility of the truck driver. The tent can also include a back panel at the truck tail gate portion which can be fastenable to the tent side panel portions by, for example, a fastening tape such as that sold under the trademark "VELCRO".

The tent topper of the present invention is easily installable on and easily removable from a vehicle having an open bed. The tent topper comprises means to support a foldable tent; means to connect the support means to a vehicle; a foldable tent; and, means to tautly retain the tent when the support means is supporting the tent.

Finally, as is described hereinafter, the tent topper of the preferred embodiment comprises: first, a plurality of roll bar shaped assemblies, each of the roll bar shaped assembly having a pair of detachable roll bar assembly supports and means to connect the pair of supports; where each detachable roll bar assembly support includes means to connect the support to a vehicle; an upward support arm having a first and a second end, the first end connected to the connection means; an inward support arm having a first and a second end, the first end connected to the second end of the upward support arm; and, means to tautly retain a tent; and where each means to connect the pair of supports includes an inward support arm connector having a first and second hollowed end, the first hollowed end receiving the second end of the inward support arm of one of the pair of detachable roll bar assembly supports and the second hollowed end receiving the second end of the inward support arm of other of the pair of detachable roll bar assembly supports; and, second, a foldable tent supportable by the plurality of roll bar shaped assemblies and tautly retainable on a vehicle by the detachable roll bar assembly support means to tautly retain a tent.

BRIEF DESCRIPTION OF THE DRAWINGS

A better understanding of the present invention will be had upon reference to the following description in conjunction with the accompanying drawings, wherein.

DETAILED DESCRIPTION OF THE PREFERRED EMBODIMENT

Figure 1:
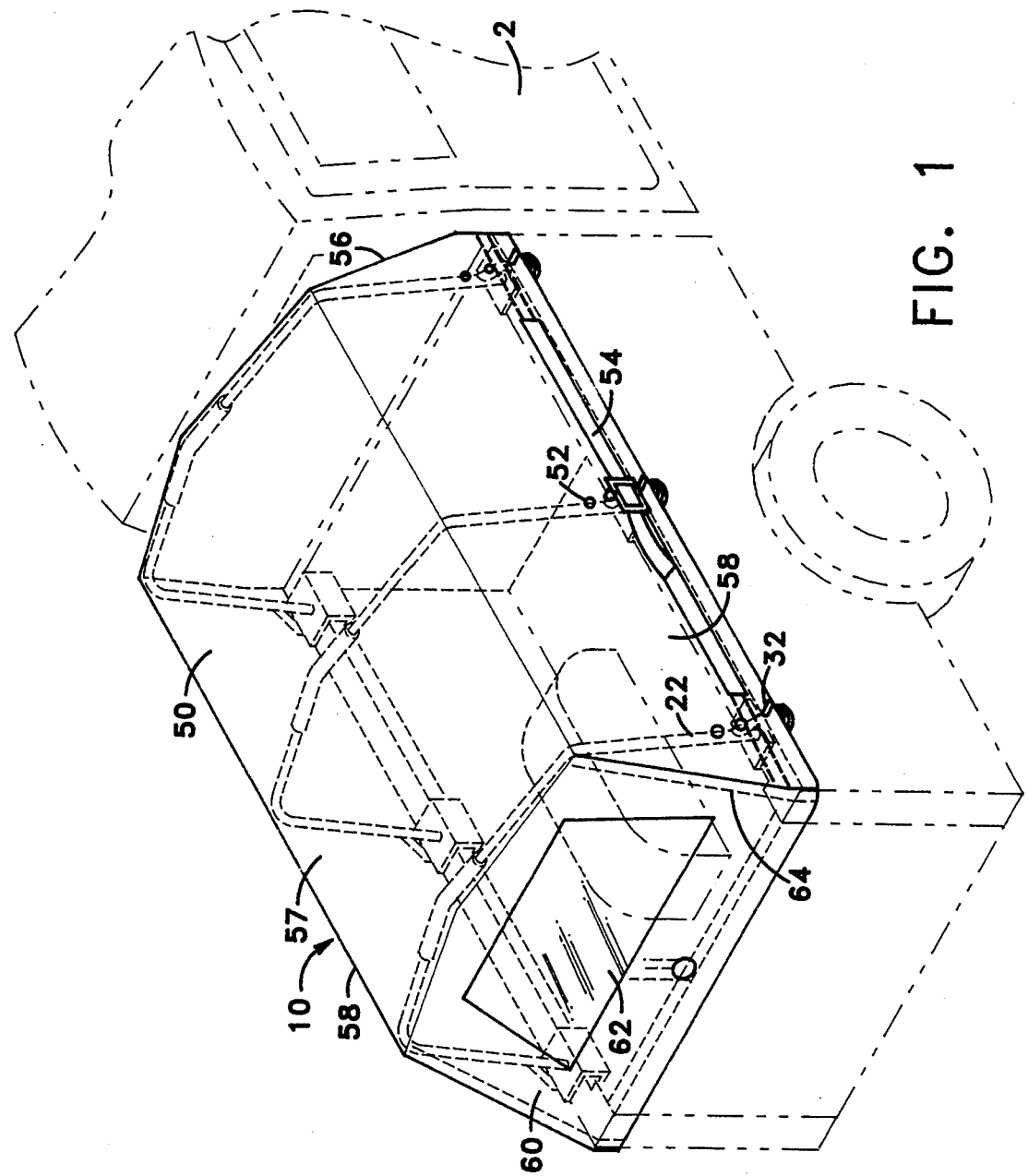
FIG. 1 shows a perspective view of the tent topper of the preferred embodiment of the present invention mounted on the bed lip of a pick-up truck (shown in phantom) showing the three roll bar assemblies in phantom which support the tent of the tent topper of the instant invention.

The tent topper of the present invention is primarily designed to fit on the bed of a pick-up truck. However, by changing the dimensions and/or number of the roll bar assemblies and the dimensions of the tent, the tent topper can be made to fit any size truck bed of any size truck. Also, by proper proportioning of the roll bar assembly components, the same roll bar assembly can fit a full-size pick-up truck or a mini-truck. Even further, the tent topper can also easily fit an open vehicle trailer or other open bed cargo-type vehicle, which, for example, may have an open rectangular trailer bed similar to a truck bed.

With reference to the Figures, the tent topper 10 of the preferred embodiment is shown tautly affixed over pick-up truck 2 bed 4. Pick-up truck 2 is shown having bed lips 6 to which the topper 10 is detachably connected, for example. Pick-up truck 2 also has a tail gate 8.

The tent topper 10 of the preferred embodiment comprises ten separable and detachable pieces which can be easily removed from the truck 2 and stowed inside the truck cab for later use, as desired by the vehicle operator. A storage case, such as, for example, a suit case sized container, not shown, can also be provided to facilitate storage of the disassembled topper 10. The ten separable pieces include six roll bar assembly supports 20, three inward support arm connectors 40, and a foldable tent 50. When installed on truck 2, a connector 40 and two supports 20 interconnect to form a roll bar shaped assembly. Therefore, as shown, there are three installed roll bar shaped assemblies. When installed, the six supports 20 and three inward support arm connectors 40 of the preferred embodiment provide means to support the foldable tent 50, means to connect the topper 10 to the truck 2, and means to tautly retain the tent 50 on the truck bed 4.

Figure 2:
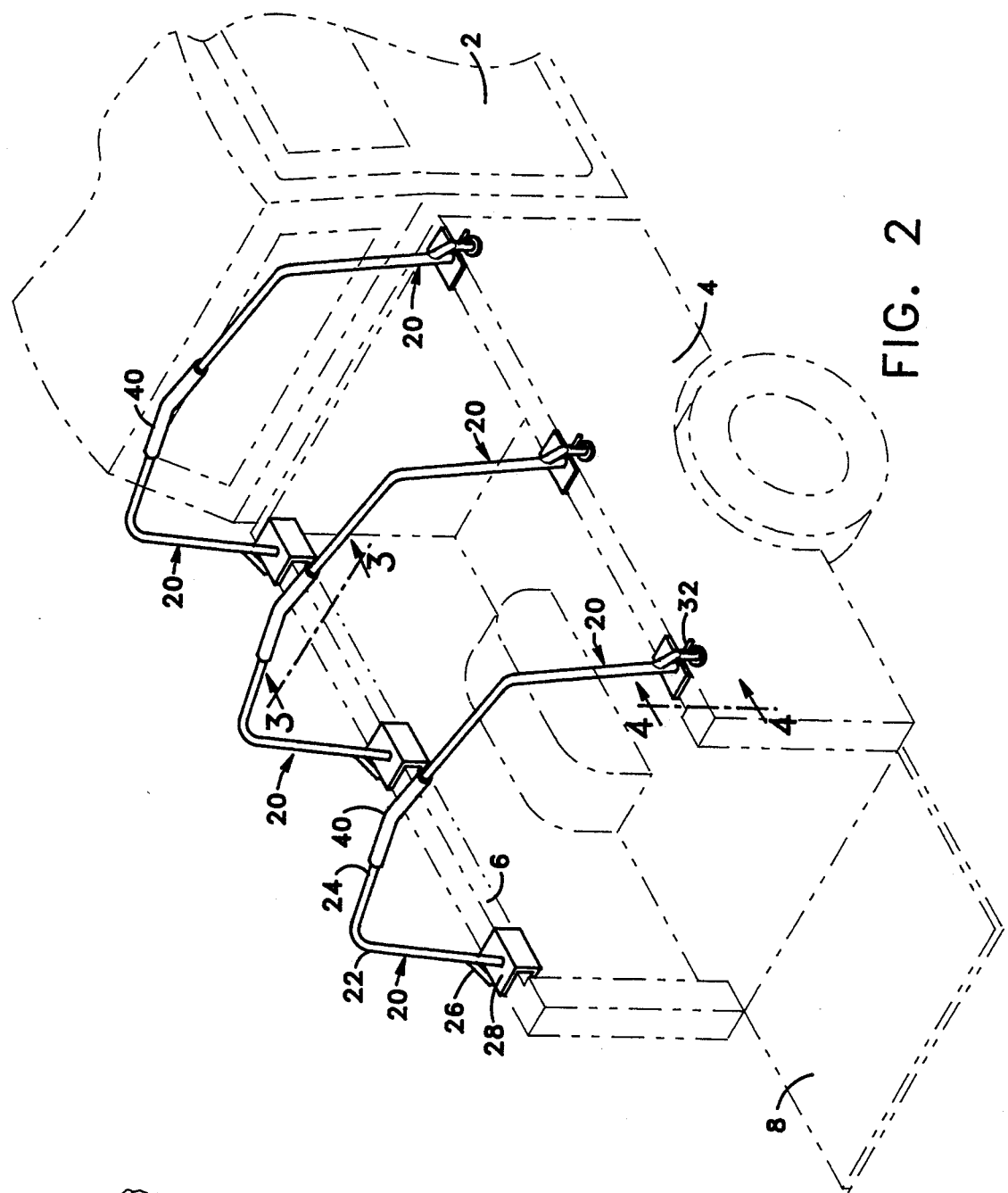
FIG. 2 shows the perspective view of FIG. 1 with the tent removed from the tent topper to better show the three roll assemblies.
Figure 4:
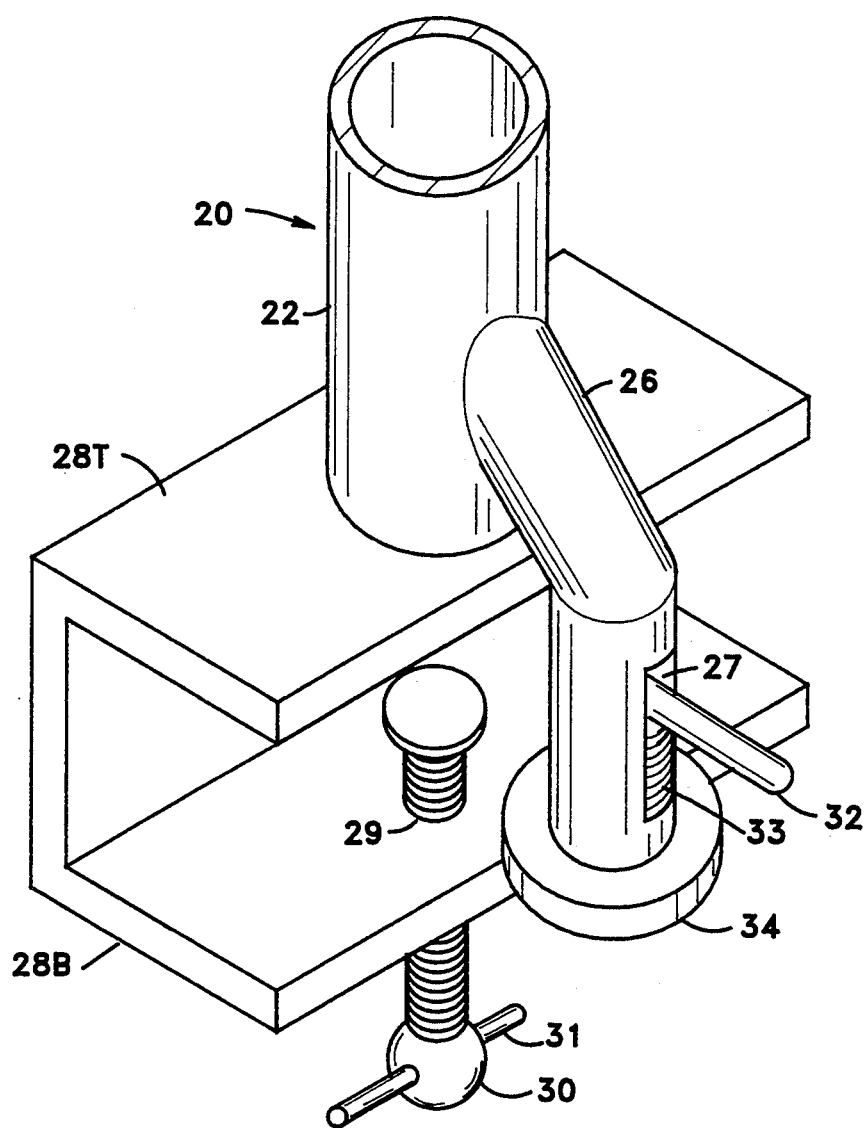
FIG. 4 shows an enlarged perspective view of a portion of a roll bar assembly support which mounts to a truck bed lip and an extender arm which has a means for stretching the tent along the lines 4—4 of FIG. 2; and, FIG. 5 shows a fragmentary side view of a portion of the tent which has openings therethrough, one of which openings is selectably placed over the adjustable pin portion of the means for stretching the tent of FIG. 4, which is shown in FIG. 1.

FIG. 2 shows how the roll bar shaped assemblies are connected to the truck bed lip 6. FIG. 4 shows an enlarged view of the portion of a support 20 which contains means to connect the topper to the truck and means to taut or stretch the tent of the topper. The roll bar shaped assemblies should preferably be made of lightweight materials to make installation and removal and storage easy. However, they need to be strong enough and rigid enough to support the tent 50 when it is installed and made taut. Therefore, while having a roll bar shape, in the preferred embodiment, the roll bar shaped assemblies are not designed to function as a vehicle weight supporting roll bar. While not shown in the drawings, additional braces can be provided which interconnect the roll bar shaped assemblies to provide additional rigidity.

As previously stated, two supports 20 and a connector 40 operate together to form one of the three shown roll bar shaped assemblies. Each support 20 includes a bracket 28 and means to secure the bracket. Most pick-up trucks, like truck 2, have a generally rectangular-shaped bed lip 6. Bracket 28 is shaped to fit the lip 6, so, as shown, it has a general "C"-shape having a top side 28T and a bottom side 28B. Bottom 28B has a threaded bore 29 therethrough which receives the means to secure the bracket, shown as threaded bolt 30 having a turning handle 31.

Each support 20 has an upward support arm 22, shown attached at one end to top 28T of bracket 28 and extending upwardly therefrom. Attached to the other end of each upward support arm 22 is one end of an inward support arm 24. Attached arms 22 and 24 are generally "L"-shaped.

For installation, two opposed supports 20 are connected to opposed lips 6 by placing respective brackets 28 over respective lips 6 at a desired location on lips 6. Brackets 28 are sized so that the distance between the respective tops 28T and bottoms 28B is sufficient to allow brackets 28 to easily fit on lips 6 without the means to tautly retain the tent, explained hereinafter, interfering with the installation. The inner ends of the respective inward support arms 24 are inserted into the ends of an inward support arm connector 40, shown in FIGS. 2 and 3, which provides means to connect a pair of supports. Then, handles 31 of threaded bolts 30 are turned to securely connect respective supports to opposed lips 6. Alternatively, opposed arms 24 can first be inserted into the ends of connector 40 and then the pair of connected supports 20 can be installed on the opposed lips 6.

Figure 3:
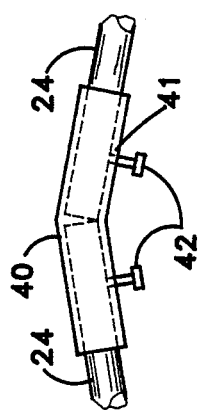
FIG. 3 shows an enlarged side cross-sectional view of one of the inward support arm connectors which secures the pair of supports which comprise a roll bar assembly along the lines 3—3 of FIG. 2.

Connector 40 may be fully hollow, as shown, or partways hollow at both of its two ends. Connector 40 has a pair of threaded bores 41 which each have, for example, a thumb screw 42 threaded therein. Thumb screws 42 are next tightened against the respective arms 24 of the two opposed supports 20 to securely form one of the three shown roll bar shaped assemblies. It is noted that connectors 40 can have a length sufficient so that the same sized roll bar shaped assemblies can fit either a full-sized pick-up truck or a mini-truck. On a mini-truck, for example, the opposed arms 24 could touch, as seen in FIG. 3. On a full-size truck, for example, the arms 24 would then be spaced apart, but still securable by screws 42.

The next two roll bar shaped assemblies are then similarly installed. As is seen in the preferred embodiment of FIG. 2, the first of the three roll bar shaped assemblies is positioned toward the truck cab portion of bed 4, the second is positioned toward the tail gate 8 portion of bed 4, and the third is positioned substantially between the first and second assemblies. As is further seen, there is a slight downward slope from the center of the truck bed 4 where arms 24 are inserted into connector 40 toward the truck lip 6 sides. This slope permits moisture to run off tent 50, when installed and made taut, as is explained hereinafter.

After the three roll bar shaped assemblies are installed, a tent 50 will be draped over the three assemblies and stretched or made taut. Tent 50 is preferable made from a rain resistant material, such as, for example, a waterproofed canvas or a plastic. Reinforcement can also be provided to make the tent 50 less susceptible to punctures or tears.

As is seen in FIG. 1, tent 50 includes a top portion 57, a pair of side portions 58, a front portion 56, and a back panel 60. Back panel 60 is shown having a transparent panel 62 contained therein. Another transparent panel, not shown, could be contained within front portion 56 to permit the truck operator to see out the rear of the truck through the topper, if desired. Back panel 60 is shown as a flap, to allow access to the bed 4. The sides of back panel 60 can be secured to the appropriate sides of both side portions 58 with, for example, zippers or fastening tape such as "VELCRO".

As is seen in FIG. 4, toward the bracket 28 end of arm 22 for each of the six supports 20, there is a downward extender arm 26 which has means for stretching or tauting the tent. Arm 26 has a top portion connected to a respective arm 22. Each arm 26 has a hollow cylindrical-shaped bottom portion which is threaded on its inside surface. Each arm 26 also has a slot opening 27 therethrough. The stretching means includes an adjustable pin 32 to retain the tent. Pin 32 is shown pivotally connected to one end of a threaded bolt 33. The other end of bolt 33 is connected to an adjustment knob 34. Each bolt 33 is threaded into the hollow bottom portion of an arm 26 so that a pin 32 extends outward through the respective slot opening 27. By turning an adjustment knob 34, the respective pin 32 can be moved up or down. This movement will be used to either taut or slack the tent 50, as desired.

Figure 5:
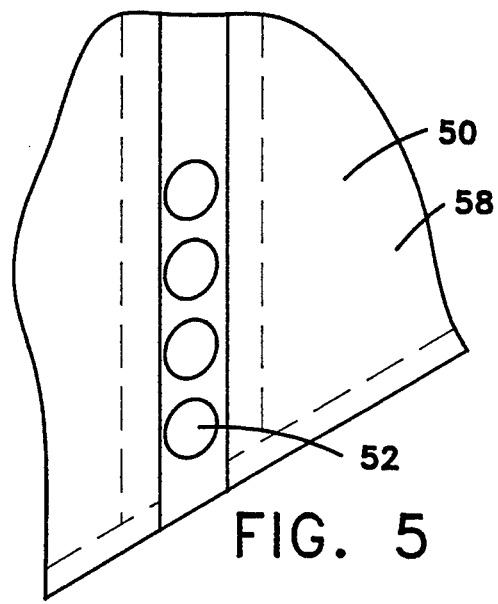

The side portions 58 contain six sets of vertically aligned openings 52 through tent 50. These openings 52 are at preselected locations on tent side portions 58 so that the six sets of openings 58 will match the locations of the six pins 32 of supports 20. Depending on the tent 50 material, openings 52 may be reinforced. While only one opening 52 per pin 32 is necessary, the fragmentary portion of tent 50 shown in the preferred embodiment of FIG. 5 shows four vertically aligned openings 52. These are provided as truck beds vary in size. This makes the topper 10 more readily useable with a variety of trucks, as well as allowing for shrinkage or stretching of the tent 50 over time.

With this understanding, to complete installation of the topper 10 as shown in FIG. 1, tent 50 is first draped over the three roll bar shaped assemblies. Side portions 58 are then aligned so that each of the six pins 32 is inserted through one appropriate opening 52. The six adjustment knobs 34 are then turned so that pins 32 pull down on the side portions 58 to stretch tent 50 to make it vertically taut. Additionally, each side portion 58 can have a horizontal belt 54 incorporated therein. The tent 50 extends downward over a portion of the exterior four sides (front, left and right sides, and tail gate) of the truck bed 4. Tightening belts 54 horizontally snugs tent 50 against the exterior of bed 4. Therefore, when the truck is operated at highway speeds, any possibility of flapping of tent 50 is greatly reduced.

The foregoing detailed description is given primarily for clearness of understanding and no unnecessary limitations are to be understood therefrom for modifications can be made by those skilled in the art upon reading this disclosure and may be made without departing from the spirit of the invention and scope of the appended claims.

What is claimed is:

1. A tent topper which is easily installable on and easily removable from a vehicle having an open bed, comprising:
(a) a plurality of roll bar shaped assemblies, each said roll bar shaped assembly having a pair of detachable roll bar assembly supports and means to connect said pair of supports;
  (1) each said detachable roll bar assembly support including means to connect said support to a vehicle; an upward support arm having a first and a second end, said first end connected to said connection means; an inward support arm having a first and a second end, said first end connected to said second end of said upward support arm; and, means to tautly retain a tent; and,
  (2) each said means to connect said pair of supports including an inward support arm connector having a first and second hollowed end, said first hollowed end receiving said second end of said inward support arm of one of said pair of detachable roll bar assembly supports and said second hollowed end receiving said second end of said inward support arm of other of said pair of detachable roll bar assembly supports;
(b) a foldable tent supportable by said plurality of roll bar shaped assemblies and tautly retainable on a vehicle by said detachable roll bar assembly support means to tautly retain a tent, wherein said foldable tent has at least one opening therethrough for each roll bar assembly support, said openings being at preselected locations on said tent and,
(c) wherein said means to tautly retain a tent of each said detachable roll bar assembly support includes:
  (1) a threaded bolt having a pivotally connected adjustable pin at a first end and a turnable adjustment knob connected at a second end; and,
  (2) a downward extender arm having a top and a bottom portion, said top portion being connected to said upward support arm, said bottom portion having a threaded bore therein, said bottom portion having a slot opening therethrough, said threaded bolt being threadably received into said threaded bore such that said pivotally connected adjustable pin extends from said threaded bore in a direction outward through said slot opening;
whereby, when said plurality of roll bar shaped assemblies are connected to a vehicle using said connection means and when said tent is supported by said plurality of roll bar shaped assemblies, each said adjustable pin extends outward through one said tent opening and each said turnable adjustment knob being rotatable to move said respective adjustable pin in a direction toward said downward extender arm bottom portion to taut said tent.

2. The tent topper of claim 1, wherein said means to connect said support to a vehicle comprises:
(a) a threaded bolt having a turnable handle; and,
(b) a C-shaped bracket to be received by a vehicle bed lip, said C-shaped bracket having a top and a bottom, said bottom having a threaded bore therethrough, said threaded bore receiving said threaded bolt, whereby said threaded bolt can securely connect said C-shaped bracket and said vehicle bed lip.

3. The tent topper of claim 1, wherein each said means to connect said pair of supports further includes a pair of threaded thumb screws, said inward support arm connector having a first threaded bore into said first hollowed end and second threaded bore into said second hollowed end, said first threaded bore threadably receiving one of said pair of threaded thumb screws such that said thumb screw securely contacts said second end of said inward support arm of one of said pair of detachable roll bar assembly supports received in said first hollowed end, and said second threaded bore threadably receiving the other of said pair of threaded thumb screws such that said thumb screw securely contacts said second end of said inward support arm of other of said pair of detachable roll bar assembly supports received in said second hollowed end.

4. The tent topper of claim 1, wherein said connected upward support arm and said inward support arm are of unitary construction and have a general L-shape.

5. The tent topper of claim 1, wherein said foldable tent is waterproof.

6. The tent topper of claim 1, wherein said foldable tent further includes a pair of horizontal adjustable belts, whereby when said tent is supported by said plurality of roll bar shaped assemblies and tautly retained on a vehicle, said pair of belts can be tightened to horizontally snug said tent around said vehicle.

7. The tent topper of claim 1, wherein said foldable tent further includes at least one transparent panel therein.

8. A tent topper which is easily installable on and easily removable from a vehicle having an open bed, comprising:
  (a) means to support a foldable tent;
  (b) means to connect said support means to a vehicle;
  (c) a foldable tent, said foldable tent having a plurality of tent openings therethrough, said openings being at preselected locations on said tent; and,
  (d) means to tautly retain said tent when said support means is supporting said tent, said means to tautly retain said tent including a plurality of tauting assemblies, each said tauting assembly including:
    (1) a threaded bolt having a pivotally connected adjustable pin at a first end and a turnable adjustment knob connected at a second end; and,
    (2) a downward extender arm having a top and a bottom portion, said top portion being connected to said means to support a foldable tent, said bottom portion having a threaded bore therein, said bottom portion having a slot opening therethrough, said threaded bolt being threadably received into said threaded bore such that said pivotally connected adjustable pin extends from said threaded bore in a direction outward through said slot opening;

whereby, when said support means is connected to a vehicle using said connection means and when said tent is supported by said support means, said adjustable pin of each said tauting assembly extends outward through one of said plurality of tent openings and each said turnable adjustment knob being rotatable to move said respective adjustable pin in a direction toward said downward extender arm bottom portion to taut said tent.

9. The tent topper of claim 8, wherein said means to support a foldable tent comprises a plurality of roll bar shaped assemblies.

* * * * *